Oct. 25, 1966 J. R. CLARK 3,281,721

IMPEDANCE MATCHING SYSTEM

Filed May 11, 1962 2 Sheets-Sheet 1

INVENTOR
JOHN R. CLARK
BY Thomas J. Nikolai
AGENT

United States Patent Office 3,281,721
Patented Oct. 25, 1966

3,281,721
IMPEDANCE MATCHING SYSTEM

John R. Clark, Houghton, Mich., assignor to Sperry Rand Corporation, New York, N.Y., a corporation of Delaware Filed May 11, 1962, Ser. No. 194,046
6 Claims. (Cl. 333—17)

This invention relates generally to impedance matching networks and more specifically to an improved arrangement for matching the impedance of a complex load to that of a generator to insure optimum power transfer from the source to the load.

Impedance matching networks find wide application in the field of electrical communication. For example, in radio transmitting systems, in order to radiate as much power as possible, it is desirable that the impedance of the antenna or load be properly matched to that of the transmitter and the transmission line connecting the transmitter to the antenna. A transmission line that is terminated in an impedance or a resistance equal to its characteristic impedance behaves like an infinite line. That is, no reflections occur at the load end and the impedance is constant at every point along the length of the line. Since there are no reflections, all the energy, except resistance losses and the like, is absorbed by the load. The problem, then, is to insure by proper matching that the load will appear to have an input impedance equal to the characteristic impedance of the transmission line.

Again considering a radio transmitting system, the load in question is generally the antenna. The electrical characteristics of an antenna are such that its impedance is frequency dependent. In other words, at a frequency of $F_1$ cycles per second the impedance of the antenna may be $Z_1=R_1+JX_1$ whereas at a frequency of $F_2$ cycles per second the impedance may be $Z_2=R_2-JX_2$. The resistance as well as the magnitude and sign of the reactance of an antenna are subject to change with a change in the frequency. It becomes immediately apparent therefore, that no fixed network may be inserted into the system to insure proper matching at all frequencies.

The present invention is concerned with an improved automatic impedance matching network which is operable over a wide range of frequencies. In other words, when the impedance of the load changes because of a change in the transmitter frequency the characteristics of the matching network are automatically varied to maintain the equivalent load impedance at the desired value.

Such systems per se are relatively well known in the art. For example, in the Vogel et al. Patent 2,838,658, issued June 10, 1958, there is described a typical prior art automatic matching network in which a so called Resistance Discriminator and a Phase Discriminator are used to develop control signals for operating servo motors, which, in turn, adjust the values of the tuning elements. The operation of these discriminators depends upon the magnitude of the voltage on the line and the current flowing through the line as well as the phase angle between the voltage and current. The discriminators separately indicate the real and reactive components of high frequency current and develop control signals for us by the tuning servo motors.

As is well known in the art, when a transmission line is not properly terminated in its characteristic impedance, the ratio of voltage to current varies from point to point along the line, and, thus, the impedance varies. For this reason it is necessary that the discriminators be located in close proximity (in terms of wave length) to the load whose impedance it is desired to match in order that the electrical manifestations detected by the discriminators be related to the characteristics of the load. In many applications this is a great disadvantage. For example, in airborne system the antenna is often located in the tail-fin of the aircraft. Because the prior art systems require that the discriminators be located close to the antenna, they are often inaccessible for maintenance and subject to the extreme environmental conditions present here.

The present invention serves to obviate these difficulties. Rather than employing discriminators to monitor the impedance characteristics of the load, the system of this invention employs a voltage standing wave ratio sensor to develop a control signal for operating the tuning elements of the matching network. Since with transmission lines of practical length the standing wave ratio remains constant over its entire length even when the load is not properly matched to the source, it is not necessary that this type of sensor be located close to the load itself. Hence, it is possible to locate the sensor in the cabin of the aircraft, for example, where it is less subject to high temperature variations and where it is easily accessible for purposes of maintenance. The system of the present invention is therefore more reliable than those of the prior art.

In order to obtain an indication of the direction in which the main tuning elements of the matching network must be adjusted to provide the desired matched condition, means are provided for causing a predetermined change in the input impedance of the load. The resulting change in the standing wave ratio is detected and compared with a fixed reference voltage. The signal resulting from this comparison is, in turn, employed to control the servo motors used to drive the tuning elements. As a result, these elements are varied until the standing wave ratio approaches 1:1 which indicates that the load is properly matched and that no energy is being reflected back from the load.

It is accordingly an object of the present invention to provide new and improved apparatus for measuring the impedance of a load from a location remote from the load.

It is another object of the present invention to provide a new and improved system for matching the impedance of a transmission line to that of the load.

It is still another object of this invention to provide an automatic impedance matching system wherein the location of the sensing circuits used therein is independent of the location of the load itself.

Still another object of this invention is to provide an impedance measuring system in which a synthetic disturbance is deliberately introduced into the load circuit so as to produce an error signal which may be used to indicate the value of the load impedance.

The above objects, as well as other objects, features and advantages of this invention will be more fully understood in view of the following description when taken in conjunction with the drawings wherein.

Figure 1:
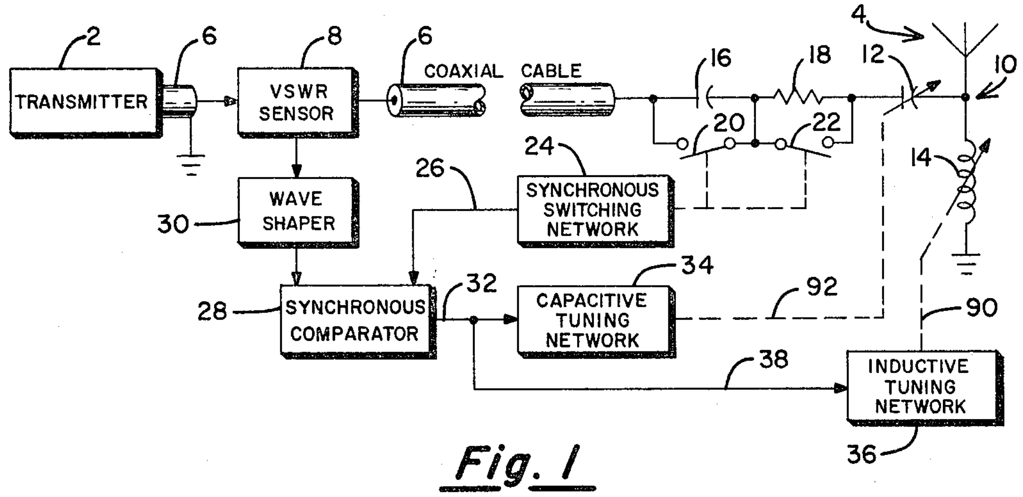
FIG. 1 is a simplified block diagram representation of an automatic impedance matching network constructed in accordance with the teachings of this invention.

Referring now to FIG. 1, there is shown a source of radio frequency energy, said source being illustrated as transmitter 2. There is also illustrated a load 4, which may take the form of a transmitting antenna. The source 2 is connected to the load 4 by means of a suitable transmission line such as coaxial cable 6. Located in close proximity to the transmitter is a voltage standing wave ratio sensor 8, which is a device capable of producing a signal proportional to the standing wave ratio of the signals appearing on the transmission line 6. Located in close proximity to the antenna 4 is a tuning network indicated generally by the numeral 10. The tuning network comprises a first variable reactance element such as capacitor 12 and a second variable reactance element such as inductor 14. As will be subsequently shown, by properly adjusting the value of these two reactance components, it is possible to make the load appear to have an input impedance quite different from its actual impedance as far as the transmitter is concerned.

Figure 5:
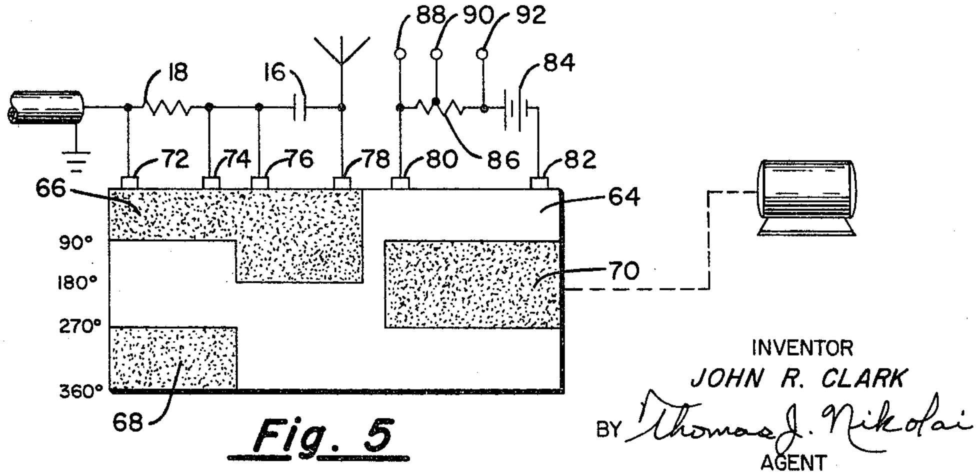
FIG. 5 shows a developed view of the synchronous switching network of FIG. 1.

Also, located relatively near the antenna 4 are a pair of electrical impedance elements 16 and 18. In the preferred embodiment of the present invention the impedance element 16 may be a capacitor which produces a reactance of about one ohm at the frequencies over which the matching network is designed to operate while the element 18 may be a resistor also of about 1 ohm in value. It should be understood, however, that it is not necessary to limit the invention to this configuration since it is possible that an inductive impedance device could be used in place of the element 18. A pair of switch contacts 20 and 22 are arranged to short out the elements 16 and 18 upon the closure thereof. The contacts 20 and 22 are arranged to be operated by a synchronous switching network 24 which may take the form of a conventional motor driven commutator device. As will be shown more fully hereinbelow, when the details of FIGURE 5 are explained, the synchronous switching network is arranged to insert a synthetic disturbance into the load circuit by first shorting out both of the elements 16 and 18, to next open switch 22 so that element 18 is introduced into the circuit, to next open switch 20 so that both elements 16 and 18 are included in the circuit, and to finally close contact 22 so that only element 16 is present in the circuit. This cycle is repeated at a rate determined by the speed of rotation of the motor driven commutator.

The synchronous switching network 24 is also operative to produce a reference voltage on the conductor 26, which is applied as a first input to a synchronous comparator 28. The other input to comparator 28 comes from the voltage standing wave ratio sensor 8 by way of a suitable wave shaping circuit 30. The function of comparator 28 is to compare the phase relationship between the reference voltage signal on line 26 and the signal from the wave shaper 30 to produce a signal proportional to the phase difference. This last mentioned signal appears on the output conductor 32 and is applied first to the capacitor tuning network 34 and secondly to the inductive tuning network 36 by way of a conductor 38. The tuning networks 34 and 36 each include suitable amplifiers and motors which respond to the signals coming from comparator 28 to cause the reactance elements 12 and 14 to be adjusted in accordance with the above mentioned error signals.

*Operation*

Figure 2:
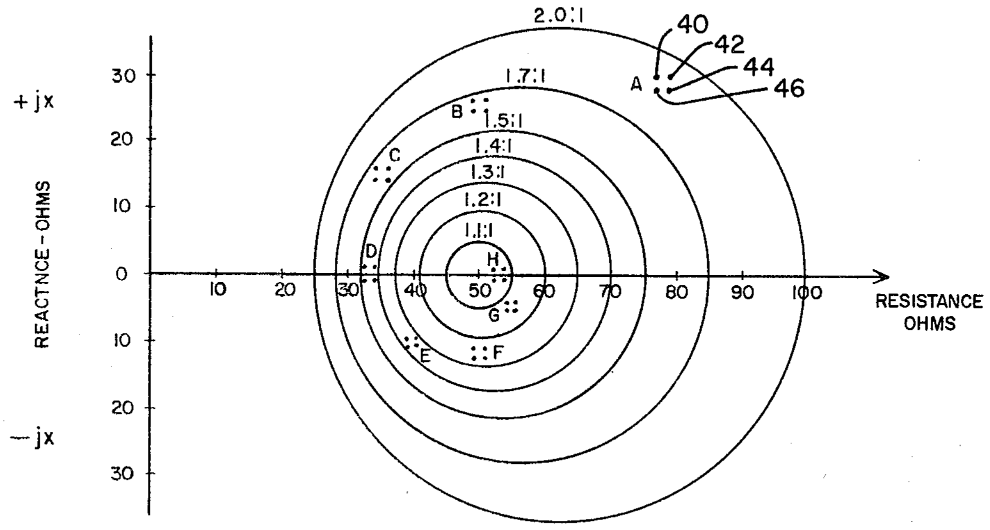
FIG. 2 illustrates the loci of constant standing wave ratios for various values of impedance drawn on the complex impedance plane.
Figure 3:
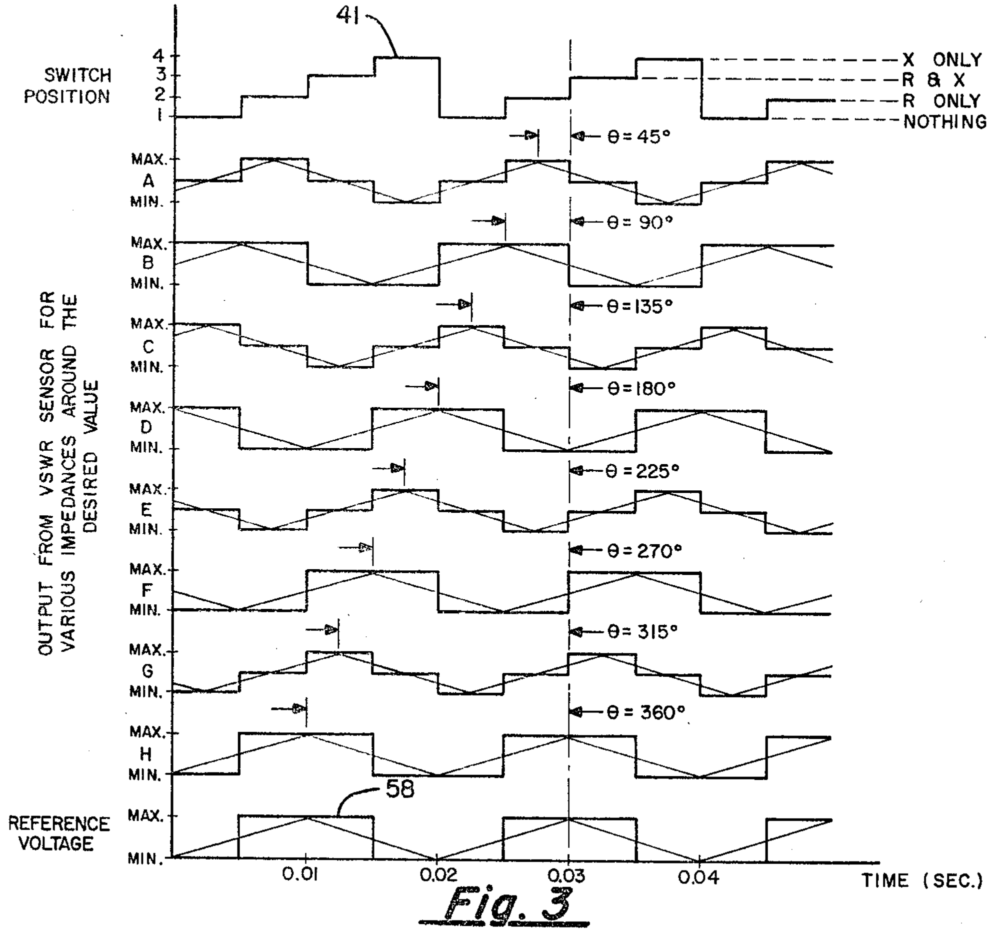
FIG. 3 illustrates the phase relationships between the output from the standing wave ratio sensor of FIG. 1 and a fixed reference voltage as the input impedance of the load circuit is altered by a predetermined amount.

The operation of the impedance matching network of FIG. 1 can best be understood by referring to FIGS. 2 and 3 of the drawings. In FIG. 2 there are plotted loci of constant wave ratios for various values of impedance drawn on the complex impedance plane. Any value of impedance which lies on a given circular locus causes the same standing wave ratio to appear on the transmission line. Let it be assumed that the characteristic impedance of the transmission line 6 is a pure resistance of 50 ohms ($50+j0$) and that it is desired to tune the load impedance to this value so that maximum power transfer may be achieved. Furthermore, let it be assumed that the frequency of the transmitter is changed so that the matched condition no longer exists. For example, the load may be properly tuned but upon changing the transmitter frequency, the load may appear to have an impedance equal to $80+j30$. This point is identified by numeral 40 in FIG. 2 and falls on the standing wave ratio locus corresponding to a ratio of 1.98:1. It is the function of the matching network of FIG. 1 to automatically tune the variable reactance elements 12 and 14 so that the apparent impedance of the load will again approach the desired value of $50+j0$.

The synchronous switching network 24 of FIG. 1 is operative to increase, in sequence, the load input resistance by a small increment, decrease the reactance by a small decrement, decrease the resistance and then return the load impedance to the original value. This is achieved by inserting and removing the impedance elements 16 and 18 from the location in series with the load. As these elements are cyclicly inserted and removed the voltage standing wave ratio sensor 8 detects the change in the standing wave ratio appearing on the line.

The curve 41 of FIG. 3 illustrates the timing of the synchronous switch. With the time scale arbitrarily chosen as illustrated, for the first 5 milliseconds of a cycle both contacts 20 and 22 of FIG. 1 are closed so that neither element 16 nor element 18 is connected into the circuit. In the time interval between 5 milliseconds and 10 milliseconds the contact 22 only is open so that only the resistance element 18 is inserted to alter the apparent load impedance. During the interval between 10 and 15 milliseconds, both contacts 20 and 22 open so that now both of the impedance elements 16 and 18 are effectively in the circuit. Finally, between the 15 and 20 milliseconds, marks, contact 22 is closed so that only the reactance element 16 is effective to alter the load impedance. This completes one cycle and at the end of the last mentioned interval the contacts are returned to the initial closed position and the foregoing sequence is again repeated. Since the speed of rotation of the commutator type switch is a matter of choice, it is to be understood that the switch contacts may be operated at a different rate than is suggested by FIG. 3 without departing from the scope of the invention.

The waveforms labeled A through H in FIG. 3 illustrate the output signal from the voltage standing wave ratio sensor 8 of FIG. 1 for the corresponding impedance A through H of FIG. 2, as the elements 16 and 18 are inserted and removed from the circuit by means of the synchronous switching network. Under the conditions previously assumed, i.e., with the apparent load impedance at point 40 (FIG. 22), at the time switch 22 is opened so that only the resistance element 18 is inserted into the circuit, the effective impedance of the load moves from point 40 to point 42 and falls on a standing wave ratio locus of larger diameter than that of point 40. Hence, the wave A representing the output from the sensor 8 increases from its initial level and remains at this increased level during the interval from 5 to 10 milliseconds. At the completion of this interval the contact 20 opens so that the capacitive reactance element 16 is inserted. Because it was assumed that the load was initially inductive, the insertion of the capacitive element 16 causes the apparent load impedance to assume a value corresponding to point 44 in FIG. 2. In other words, the addition of the small capacitive reactance decreases the inductance of the load by a small amount. It can be seen that point 44 lies on approximately the same standing wave ratio locus as point 40 and hence, the wave A at the 10 millisecond mark returns to its initial level and remains there until the 15 millisecond point is reached. At this last mentioned time, contact 22 is closed, while contact 20 remains open. The effect of this is to cause the resistance portion of the load impedance to decrease by a small amount so that the load impedance appears to have a value corresponding to point 46 in FIG. 2. It can be seen that point 46 lies on a standing wave ratio locus of smaller diameter than that of either points 40, 42 or 44. The wave A therefor drops to a minimum value and remains at this value until the 20 millisecond point is reached at which time both contacts 20 and 22 are again closed to return the impedance to point 40. The remaining waves B through H of FIG. 3 are traced out in exactly the same manner as explained in connection with wave A, the only difference being the starting point from which the impedance moves as the synchronous switch is operated. It can be seen, then, that by periodically inserting and removing small impedance elements, it is possible to produce a voltage wave, the phase relationship of which with respect to a fixed reference wave is a function of the load impedance.

Figure 4:
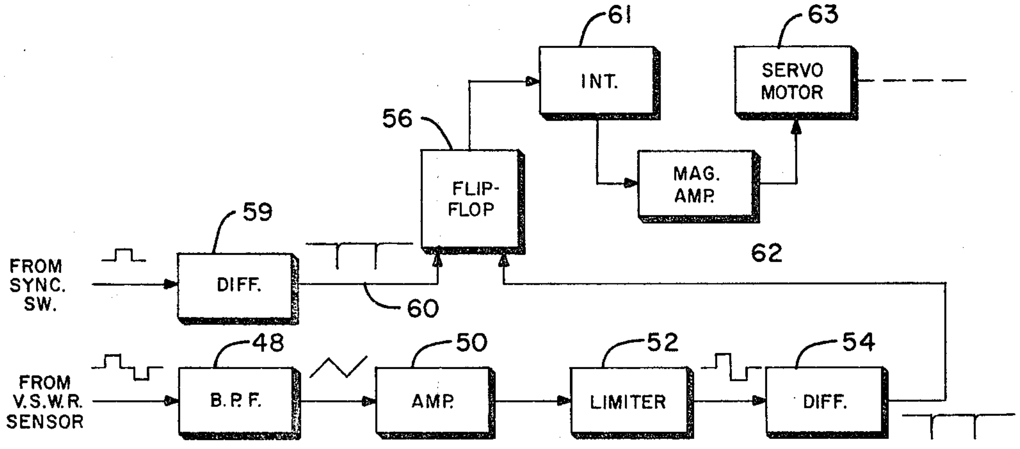
FIG. 4 illustrates in block diagram form a typical synchronous comparator suitable for use with the system of FIG. 1.

For the purposes of explanation, the tuning process is described as though it occurs in discrete steps, but it should be understood that in normal operation the tuning is a continuous process. Referring again to FIG. 1 as the switch 24 runs through the above mentioned cycle the wave A of FIG. 3 appears at the ouput sensor device 8 and is applied to the wave shaping network 30. By referring to FIG. 4 it can be seen that included within the wave shaping network are a band pass filter 48, an amplifier 50, a limiter or clipping circuit 52, and a differentiating circuit 54. The effect that the band pass filter has on the waveform from the sensor 8 is to remove substantially all frequency components except the fundamental or first harmonic of the standing wave ratio sensor voltage. The resulting sine wave after filtering is represented in FIG. 3 by the triangular shaped wave superimposed on the waveform A. The amplifier and limiter circuits operate on this wave and convert it into a square wave type signal in the well-known manner. The square wave signal is then differentiated to produce a sharp spike at the point in the cycle where the square wave crosses the zero axis heading in the negative direction. The output from the differentiator 54 is connected to one side of a suitable trigger circuit such as flip-flop 56 which forms port of the synchronous comparator circuit.

The reference voltage is represented by waveform 58 in FIG. 3. As was mentioned earlier, the reference voltage is generated in the synchronous switching network. The manner in which this is done is described below in connection with the apparatus of FIG. 5. This reference voltage signal is applied to the differentiator network 59 which operates on this reference signal to produce a series of negative going voltage spikes at the point in the cycle corresponding to the time at which the reference voltage signal crosses the zero axis heading in the negative direction. This signal is applied by way of the conductor 60 to the other input terminal of the flip-flop 56. Because of the manner in which the output from differentiator circuit 54 and differentiator circuit 58 are connected to the flip-flop 56, if the original voltage waves happen to differ in phase by exactly 180°, the main current will flow for equal intervals of time through each side of the flip-flop 56, such that the average value of the wave is zero.

When the waves differ in phase by an angle other than 180°, the operating periods of the active elements in the flip-flop are unequal and the average value may be either positive or negative. As the current waves within the bistable circuit are rectangular, a suitable integrating circuit 61 may be connected to the output thereof such that the signal appearing at the output of the integrator may be linearally proportional to the phase displacement between the sensor output voltage and the reference voltage. The flip-flop 56 and integrator therefore act as a phase comparator. The integrated output signal from the comparator appearing on line 32 is proportional to the phase difference between the output from the standing wave ratio sensor 8 and the reference voltage appearing on conductor 26. The resulting error signal may be employed by a suitable servo system for tuning the reactive elements 12 and 14. It can be seen then that by deliberately introducing a small and predetermined change in the input impedance it is possible to develop an error signal which may be employed to tune the network so that the load appears to have a predetermined value of input impedance.

When the synchronous switch operates to open contact 22 if the standing wave ratio at the input of the coaxial cable 6 increases, it is known that the input resistance of the load is greater than the desired value of 50 ohms and that the reactive network must be tuned to decrease the effective load resistance. Likewise, when both contacts 20 and 22 are open, if the standing wave ratio increases then it is known that the tuning unit has an input impedance with a negative reactance and that the load must be tuned to increase the inductive reactance until the two balance out. The resulting output from the standing wave ratio sensor for this condition is represented by waveform G of FIG. 3. Had the standing wave ratio decreased when switch contact 22 was first opened and then again when switch 20 was opened, it is immediately apparent that the impedance lies in the quadrant between 90° and 180° such as at a point indicated by the letter C in FIG. 2. The resulting waveform C in FIG. 3 when compared with the reference voltage signal will produce an error signal which is used by the tuning servo motors to adjust the reactive elements 12 and 14. The direction in which the motors rotate is a function of the error signal and hence, the adjustment made is in a direction to reduce the standing wave ratio.

Referring again to FIG. 4, the output from the integrator is applied to the control winding of a magnetic amplifier 62 in a conventional manner such that the output thereof is an alternating current signal which varies in accordance with the error signal. After amplification the error signal is applied to the servo motor 63. The shaft of this motor is mechanically connected to one or the other of reactive elements 12 and 14 so that these elements may be automatically adjusted to minimize the standing wave ratio on the line. Although not shown in FIG. 4, it should be understood that there is an additional servo motor response to the output from the integrator which is used to adjust the other reactive element.

The servo motor 63 may be one of several well known types. For example, one type that may be used is a two phase induction motor in which a fixed alternating current reference voltage is applied to a first winding and the amplifier error signal is applied to the second winding means and provided for shifting the phase of the error signal from that of the servo motor reference voltage by 90°. If there is no error voltage existing the rotor remains stationary. This condition exists only when the signal from the standing wave ratio sensor is in phase with the reference voltage on line 26 of FIG. 1 and is indicative of a properly matched condition. If there is an error voltage which either leads or lags the signal applied to the reference winding and a rotating magnetic field is created and the rotor turns in the appropriate direction to null the error voltage. The speed of rotation is a function of the amplitude of the alternating current error signal coming from the output of the magnetic amplifier.

FIG. 5 illustrates a developed view of the preferred form of the synchronous switching network which may be employed in the apparatus of FIG. 1. The cylinder 64 is made from an insulating material on which is affixed a plurality of conductive segments 66, 68, and 70, arranged in a predetermined pattern. Operatively associated with the cylinder 64 are a plurality of brush type contacts 72 through 82. These contacts are in turn connected to the impedance elements 16 and 18. The contacts 80 and 82 are connected to a source of potential 84 which, in turn, is connected in series with a voltage divider resistor 86. It is readily apparent from this figure that for the first 90° of rotation of the cylinder, the elements 16 and 18 are shorted out of the circuit. Between the 90° and 180° interval brush 72 is not shorted to the brush 74 by the conductive segment 66 and hence, the resistor 18 is effective in the circuit during this interval. However, the brush 76 remains shorted to the brush 78 so that the element 16 is still out of the circuit. In the interval between 180° and 270° the cylinder 64 is void of any conductive segment and, hence, both of the elements 16 and 18 are effectively connected in series between the source and the load. Again during the interval 270° to 360° the conductive pattern 68 is present to short out brush 72 to brush 74 and remove the resistance element from the circuit. This completes a full rotation of the synchronous switch and the cycle is again repeated. In order to produce the reference voltage waveform 58 of FIG. 3, the conductive pattern 70, which is arranged to cooperate with the brushes 80 and 82 is included. In the interval between 90° and 270° the brush 80 is shorted by the pattern 70 to the brush 82. This completes a series circuit so that current flows from the battery 84 through the resistor 86 and from brush 80 to brush 82 and to the opposite terminal of the source. By properly connecting the terminals 88, 90 and 92 to the apparatus of FIG. 4 it is possible to derive the desired reference voltage wave.

In this specification, the desired artificial disturbance has been activated by switching discrete components of resistance and capacitance into and out of the system. It should be understood that alternate schemes for creating a similar disturbance are available. For example, the reactive components of the disturbance can be achieved by superimposing a small, rapid oscillation of the positioning signal sent to the main tuning component drive assembly. Similarly, the resistive components of the comparator may be achieved by a combined oscillation of both the tuning capacitor and tuning inductor.

Thus, there has been described an efficient system for automatically tuning the apparent impedance of a load so that it is matched to the characteristic impedance of a transmission line connecting the load to a source of high frequency energy. While a preferred embodiment of the invention has been shown, it will be readily apparent to those skilled in the art that change may be made in the invention without departing from the spirit thereof. Accordingly, it is intended that the invention be limited solely by the scope of the appended claims.

What is claimed is:

1. An automatic impedance matching system for coupling a source of high frequency energy to a complex load comprising: a source of high frequency electrical energy; load means having a frequency dependent input impedance; a first adjustable reactance; a resistance element; a second adjustable reactance; cable means connecting said first reactance and said resistance element in series between said source and said load; means connecting said second reactance in shunt with said load; a third reactance; means for periodically inserting and removing said resistance and said third reactance into and from said circuit in a predetermined sequence; means connected in series between said source and said load for generating a signal proportional to the standing wave ratio present in said cable means; means for comparing said signal with a predetermined reference signal; and means responsive to the output of said comparison means for adjusting said first and second reactance means to decrease the standing wave ratio.

2. An automatic impedance matching system for coupling a source of high frequency energy to a complex load comprising: a source of high frequency electrical energy; load means having a complex impedance characteristic; a first adjustable reactance; a resistance element; a second adjustable reactance; cable means connecting said first reactance and said resistance element in series between said source and said load; means connecting said second reactance in shunt with said load; a third reactance; switching means for periodically inserting and removing said resistance and said third reactance into and from said circuit in a predetermined sequence; standing wave ratio sensing means connected in series between said source and said load for generating a signal proportional to the standing wave ratio present in said cable means; means for comparing said signal with a predetermined reference signal as said switching means is operated; and means responsive to the output of said comparison means for adjusting said first and second reactance means to decrease the standing wave ratio.

3. An automatic impedance matching system for coupling a source of high frequency energy to a complex load comprising; a source of high frequency electrical energy; load means having a complex impedance characteristic; a first adjustable reactance; a resistance element; a second adjustable reactance; cable means connecting said first reactance and said resistance element in series between said source and said load; means connecting said second reactance in shunt with said load; a third reactance; synchronous switching means for periodically inserting and removing said resistance and said third reactance into and from said circuit in a predetermined sequence and for generating a reference voltage; standing wave ratio sensing means connected in series between said source and said load for generating a signal proportional to the standing wave ratio present in said cable means; means for comparing said signal with said reference voltage; and motor means responsive to the output of said comparison means for adjusting said first and second reactance means to decrease the standing wave ratio on said cable means.

4. An automatic impedance matching system for coupling a source of radio frequency signals to a load comprising: a source of radio frequency signals; a load having a complex impedance characteristic located remote from said source; a coaxial cable for connecting said source to said load; first and second variable reactance means connected in relative proximity to said load, said first reactance being in series with said load and said second reactance being in shunt with said load; first and second electrical impedance elements; synchronous switching means adapted to periodically connect said first impedance in series with said first reactance and said second impedance in series with said load and for producing a reference voltage; voltage standing wave ratio sensing means connected in relative proximity to said source for generating a signal proportional to the voltage standing wave ratio on said cable; comparator means adapted to receive said reference voltage and the signal from said sensing means for producing a control signal proportional to the phase displacement between said reference voltage and said sensor signal, and motor means responsive to said control signal adapted to vary the reactance of said first and second reactance means thereby decreasing said standing wave ratio.

5. An automatic impedance matching system for coupling a source of radio frequency signals to a load comprising: a source of radio frequency signals; a load having a complex impedance characteristic located remote from said source; a coaxial cable for connecting said source to said load; first and second variable reactance means connected in relative proximity to said load, said first reactance being in series with said load and said second reactance being in shunt with said load; first and second electrical impedance elements; synchronous switching means adapted to periodically connect said first and second impedances in series with said load and for producing a reference voltage; voltage standing wave ratio sensing means connected in relative proximity to said source for generating a signal proportional to the voltage standing wave ratio on said cable; comparator means adapted to receive said reference voltage and the signal from said sensing means for producing a control signal proportional to the phase displacement between said reference voltage and said sensor signals; amplifier means adapted to receive said control signals and motor means responsive to said amplified control signal adapted to vary the reactance of said first and second reactance means in a manner to decrease said standing wave ratio.

6. An automatic impedance matching system for coupling a source of radio frequency signals to a load comprising: a source of radio frequency signals; a load having a complex impedance characteristic located remote from said source; a coaxial cable for connecting said source to said load; first and second variable reactance means connected in relative proximity to said load, said first reactance being in series with said load and said second reactance being in shunt with said load; a capacitor; a resistor; synchronous switching means adapted to periodically connect said capacitor in series with said first reactance and said resistor in series with said load and for producing a reference voltage; voltage standing wave ratio sensing means connected in relative proximity to said source for generating a signal proportional to the voltage standing wave ratio on said cable; comparator means adapted to receive said reference voltage and the signal from said sensing means for producing a control signal proportional to the phase displacement between said reference voltage and said sensor signal; and motor means responsive to said control signal adapted to vary the reactance of said first and second reactance means in a direction to decrease said standing wave ratio.

References Cited by the Examiner

UNITED STATES PATENTS

| | | | |
|---|---|---|---|
| 2,611,030 | 9/1952 | Sontheimer | 333—17 |
| 2,745,067 | 5/1956 | True et al. | 333—17 |
| 2,855,599 | 10/1958 | Kandoian | 343—750 X |
| 2,874,274 | 2/1959 | Adams et al. | 343—861 X |
| 2,910,655 | 10/1959 | Ludvigson | 333—17 |
| 2,921,273 | 1/1960 | Broadhead et al. | 333—17 |
| 2,981,902 | 4/1961 | Familier | 333—17 |
| 2,993,204 | 7/1961 | Macalpine | 343—750 X |

OTHER REFERENCES

The A. R. R. L. Antenna Book, by the American Radio Relay League, Ninth edition, 1960; page 73.

HERMAN KARL SAALBACH, *Primary Examiner.*

E. LIEBERMAN, *Assistant Examiner.*